S. RITTY.
HORSE HAY-RAKE.

No. 188,677. Patented March 20, 1877.

Witnesses:
Greneville Lewis.
M. K. Benny

Inventor.
Sebastian Ritty,
By Hill & Ellsworth
His Attys

UNITED STATES PATENT OFFICE.

SEBASTIAN RITTY, OF DAYTON, OHIO, ASSIGNOR OF PART OF HIS RIGHT TO JOHN DODDS AND THOMAS MATHISON, OF SAME PLACE.

IMPROVEMENT IN HORSE HAY-RAKES.

Specification forming part of Letters Patent No. 188,677, dated March 20, 1877; application filed February 20, 1877.

*To all whom it may concern:*

Be it known that I, SEBASTIAN RITTY, of Dayton, in the county of Montgomery and State of Ohio, have invented a new and useful Improvement in Horse Hay-Rakes; and I do hereby declare the following to be a full, clear, and exact description of the same, reference being had to the accompanying drawings, forming part of this specification, in which—

Figure 1:
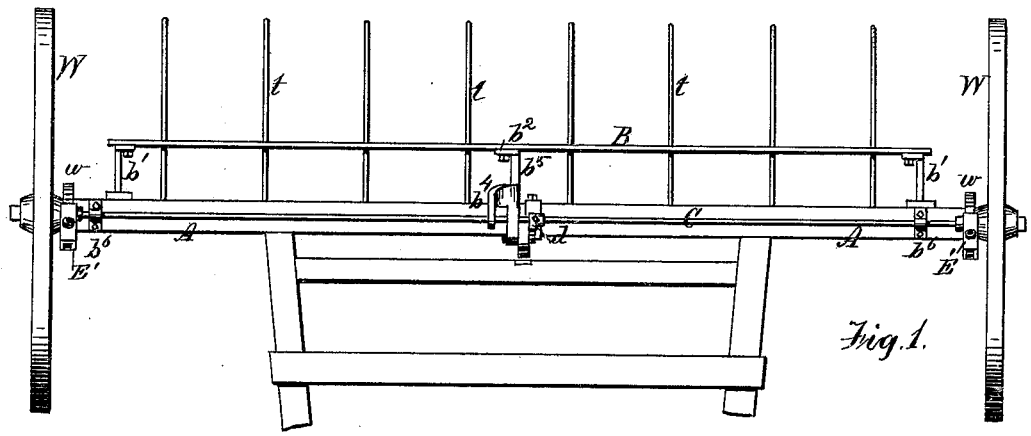
Figure 2:
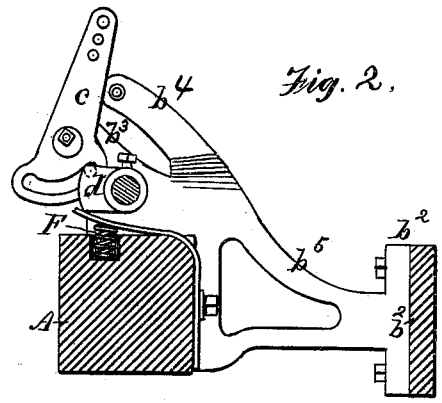
Figure 3:
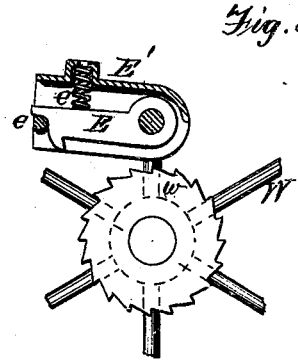

Figure 1 is a top-plan view of the rake. Fig. 2 is a vertical cross-section of the axle or oscillating rake-head in line $x\ x$ of Fig. 1, and Fig. 3 is a vertical section of the dog which engages with the ratchet-wheel to lift the rake-teeth.

Similar letters of reference in the accompanying drawings denote the same parts.

This invention relates to that class of horse hay-rakes in which the load is dumped by the power of the team at the will of the operator, and the rake automatically reset; and the invention consists in an improved means by which the driver can at will cause the rake-teeth to be raised or lowered for the purposes referred to.

In the drawings, W are the traction-wheels, having ratchets $w$ on the inner end of their hubs, and A is the axle on which said wheels turn, the axle being hinged to the tongue or thills so as to rock, for the purpose of raising or dropping the rake-teeth $t\ t$. B is the tooth-board, supported from the axle by three (more or less) brackets, $b\ b^1$, the middle one of which is provided with a rear arm, $b^5$, an upward flange, $b^2$, and two arms, $b^3\ b^4$, as shown in Fig. 2, while the end ones are only provided with the rear arm $b^5$ and the upward flange $b^2$. A hand-lever may be attached to the arm $b^4$, by which the rake-teeth may be raised or dropped by the device without using the power of the team therefor. The automatic dumping of the load is effected as follows: C is an oscillating bar, having its bearings in the flanges $b^6$, and its ends over the ratchets, and having a slotted cam-lever, $c$, connected with it by an arm, $d$, and a pin, as shown in Fig. 2, said lever being pivoted on the arm $b^3$. On the ends of the bar are two dogs, E, arranged vertically above the ratchet-wheel, which, when lever $c$ is thrown forward, will engage with the ratchet-teeth and cause the latter to lift the rake-teeth, and, when the lever is thrown back, will move upward away from the ratchets and allow the teeth to drop. The dogs are constructed as shown in Fig. 3—that is to say, each is mounted loosely on the bar, inside of a casing, E', fixed to the bar, and is held down against a stop, $e$, by a small spring, $e'$, so that, although controlled by the movement of the bar, they can adjust themselves within certain limits to the position of the ratchets. Springs F are provided for the purpose of raising the dogs when the cam-lever is unlocked. Both the arm $d$ and the casings E' are preferably attached to the bar by set-screws, so that they can be adjusted as desired.

The operation of the rake is as follows: When raking, the dogs are raised from the ratchets, and the traction-wheels turn freely. When the driver desires to dump the load, he throws the cam-lever $c$ forward, by hand or foot, till the pin locks in the end of the slot, which movement of the lever rocks the bar C, and causes the dogs to engage with the ratchets. The continued forward movement of the traction-wheels then rocks the whole axle, and raises the teeth out of the hay. When the axle has thus rocked forward far enough, the end of the cam-lever strikes against the frame, or against a stop provided for the purpose, whereby the lever is reversed, and the dogs disengaged from the ratchets, and thereupon the teeth drop back by their own gravity, and commence again to rake.

The hand-lever referred to may be employed to raise the teeth from the ground when, in going to or returning from the field, or at any other time, it is desired to hold the teeth up longer than the revolution of the wheels would permit if the automatic apparatus were brought into use.

I claim as my invention—

1. In a horse hay-rake, the combination of the slotted cam-lever $c$, arm $d$, and pin with the oscillating bar C, dogs, and ratchets, substantially as described.

2. The bracket $b^1$, constructed with the rear extension $b^5$, vertical flange $b^2$, and arms $b^3$ $b^4$, substantially as described.

3. The combination of the loose dogs E with their casings E', stops $e$, and springs $e'$, and with the oscillating bar and ratchet-wheels, substantially as described.

SEBASTIAN RITTY.

Witnesses:
 ORION DODDS,
 DAVID K. BOYER.